(12) United States Patent
Goffin

(10) Patent No.: US 7,636,884 B2
(45) Date of Patent: Dec. 22, 2009

(54) VISUALLY ENHANCED TEXT AND METHOD OF PREPARATION

(76) Inventor: Yueh Heng Goffin, 64 Mountain Ave., Summit, NJ (US) 07901

( * ) Notice: Subject to any disclaimer, the term of this patent is extended or adjusted under 35 U.S.C. 154(b) by 854 days.

(21) Appl. No.: 11/295,074

(22) Filed: Dec. 6, 2005

(65) Prior Publication Data

US 2007/0130516 A1    Jun. 7, 2007

(51) Int. Cl.
*G06F 17/00* (2006.01)
(52) U.S. Cl. ............... 715/243; 715/255; 715/236; 704/2
(58) Field of Classification Search .......... 715/243, 715/236; 704/4, 5
See application file for complete search history.

(56) References Cited

U.S. PATENT DOCUMENTS

| | | | |
|---|---|---|---|
| 4,270,284 A * | 6/1981 | Skellings | 434/156 |
| 6,438,515 B1 * | 8/2002 | Crawford et al. | 704/5 |
| 6,639,139 B2 | 10/2003 | Muller | |
| 6,651,039 B1 * | 11/2003 | Ikuta et al. | 704/4 |
| 6,778,950 B2 | 8/2004 | Gohari | |
| 7,047,255 B2 * | 5/2006 | Imaichi et al. | 707/104.1 |
| 7,080,317 B2 * | 7/2006 | Lebow | 715/236 |
| 2003/0145278 A1 * | 7/2003 | Nielsen | 715/511 |
| 2003/0203343 A1 * | 10/2003 | Milner | 434/157 |

OTHER PUBLICATIONS

Dyck, Paul Headline: "So rare a use": scissor, reading, and devotion at Little Gidding: Sep. 22, 2003.*
Baden, Catherin Bow, Steve Bird: Functional Requirment for an Interlinear Text Editor: 2004.*
Baden Hughes, Steven Bird, Catherin Bow Date: Encoding and Presenting Interlinear Text Using XML Technologies: 2003.*
Cathy Bow, Baden Hughes and Steven Bird: Towards a General Model Of Interlinear Text: 2003.*

* cited by examiner

*Primary Examiner*—Doug Hutton
*Assistant Examiner*—Mustafa Amin
(74) *Attorney, Agent, or Firm*—Altimatia, LLC; David M. Gange

(57) ABSTRACT

A visually enhanced text and methods of production are described. The visually enhanced teaching text comprises a first and at least one additional text. The first text is displayed in horizontal lines. The at least one additional text displayed interlinearly with the first text and passages in the at least one additional text that correspond with passages in a first text are placed vertically adjacent passages in the first text. Gaps are formed in the first text when the noncorresponding text in the at least one additional text is longer than the noncorresponding text in a first text. Multiple copies of identical symbols are replaced with a single copy in a different font when the symbols are vertically adjacent within corresponding text passages.

11 Claims, 3 Drawing Sheets

| 16 | Matt. 3.13-17 – Mark 1.9-11 – Luke 3.21-22 – John 1.29-34 | | | [no. 18] |
|---|---|---|---|---|
| | 18. The Baptism of Jesus | | | |
| | Matt. 3.13-17<br>17.5<br>*(no. 16  3.11-12  p. 14)* | Mark 1.9-11<br>9.7<br>*(no. 16  1.7-8  p. 14)* | Luke 3.21-22<br>9.35 | John 1.29-34<br>12.28-30<br>*(no. 16  1.24-28  p. 14)* |
| 3 | ¹³Then Jesus came from Galilee to the Jordan to John, to be baptized by him. ¹⁴John would have prevented him, saying, "I | ⁹In those days Jesus came from Nazareth of Galilee | ²¹Now when all the people were baptized, | ²⁹The next day he saw Jesus coming toward him, and said, "Behold, the Lamb of God, who takes away the sin of the world! ³⁰This is he of whom I |
| 6 | need to be baptized by you, and do you come to me?" ¹⁵But Jesus answered him, | | | said, 'After me comes a man who ranks before me, for |
| 9 | "Let it be so now; for thus it is fitting for us to fulfil all righteousness." Then he consented. | and was baptized by John in the Jordan. ¹⁰And when | | he was before me.' ³¹I myself did not know him; but for this I came baptizing with water, that he might be revealed to Israel." |
| 12 | ¹⁶And when Jesus was baptized, he went up immediately from the water, and behold, the heavens were | he came up out of the water, immediately he saw the heavens | and when Jesus also had been baptized and was praying, the heaven was | |
| 15 | opened and he saw the Spirit of God descending like a dove and alighting on him; | opened and    the Spirit descending upon him like a dove; | opened, ²²and   the Holy Spirit descended upon him in bodily form, as a dove, | ³²And John bore witness, "I saw the Spirit descend as a dove from heaven, and it remained on him. ³³I myself did not know him; but |
| 18 | | | | |
| 21 | ¹⁷and lo, a voice    from heaven, saying, | ¹¹and a voice came from heaven, | and a voice came from heaven, | he who sent me to baptize with water said to me, 'He on whom you see the Spirit descend and remain, this is he who baptizes with the Holy Spirit.' ³⁴And I |
| 24 | | | | have seen and have borne witness that this is the Son of God." |
| | "This is my beloved Son, with whom I am well pleased." <br>*(no. 20  4.1-11  p. 19)* | "Thou art my beloved Son; with thee I am well pleased." <br>*(no. 20  1.12-13  p. 19)* | "Thou art my beloved Son; with thee I am well pleased."  | *(no. 21  1.35-51  p. 21)* |
| | 17.5 *(no. 161, p. 152)* | 9.7 *(no. 161, p. 152)* | | 12.28-30 *(no. 302, p. 271)* |
| 27 | ᵇHe was still speaking, when lo, a bright cloud overshadowed them, and a voice   from the cloud said, | ᵈAnd a cloud overshadowed them, and a voice came out of the cloud, | 9.35 *(no. 161, p. 152)* <br>ᵏAnd a voice came out of the cloud, saying, | ᵐ"Father, glorify thy name." Then a voice came from heaven, "I have glorified it, and I will glorify it again." |

Prior Art

Figure 1

THE BAPTISM OF JESUS (MT 3:13-17 / MK 1:9-11 / LK 3:21-22 / JN 1:29-34)

THEN
IN THOSE DAYS
NOW WHEN ALL THE PEOPLE WERE BAPTIZED, JESUS
THE NEXT DAY HE SAW JESUS

CAME FROM NAZARETH OF GALILEE TO THE JORDAN TO JOHN, TO BE BAPTIZED BY HIM. JOHN WOULD HAVE PRE-
COMING TOWARD HIM, AND SAID, "BEHOLD, THE LAMB OF GOD, WHO TAKES AWAY THE SIN OF THE WORLD! THIS IS HE OF WHOM I SAID,
VENTED HIM, SAYING, "I NEED TO BE BAPTIZED BY YOU, AND DO YOU COME TO ME?" BUT JESUS ANSWERED HIM, "LET IT BE SO NOW;
'AFTER ME COMES A MAN WHO RANKS BEFORE ME, FOR HE WAS BEFORE ME.' I MYSELF DID NOT KNOW HIM; BUT FOR THIS I CAME
FOR THUS IT IS FITTING FOR US TO FULFIL ALL RIGHTEOUSNESS." THEN HE CONSENTED. AND WHEN JESUS
BAPTIZING WITH WATER, THAT HE MIGHT BE REVEALED TO ISRAEL." WHEN JESUS ALSO

WAS BAPTIZED BY JOHN IN THE JORDAN. AND WHEN HE WENT UP OUT OF THE WATER,
HAD BEEN BAPTIZED, AND WAS PRAYING, CAME UP

IMMEDIATELY FROM THE WATER, AND BEHOLD, THE HEAVENS WERE OPENED,
HE SAW WAS
AND JOHN BORE WITNESS,

AND HE SAW THE HOLY SPIRIT OF GOD DESCENDING UPON HIM
"I SAW AND ALIGHTING ON HIM;

LIKE A DOVE; FROM HEAVEN, AND IT REMAINED ON HIM. I MYSELF DID NOT KNOW HIM;
IN BODILY FORM,

AND LO, A VOICE CAME FROM HEAVEN; SAYING,
BUT HE WHO SENT ME TO BAPTIZE WITH WATER SAID TO ME, 'HE ON WHOM YOU SEE THE
SPIRIT DESCEND AND REMAIN, THIS IS HE WHO BAPTIZES WITH THE HOLY SPIRIT.' AND I HAVE SEEN AND HAVE BORNE
WITNESS THAT THIS IS THE BELOVED SON; WITH
"THIS IS MY BELOVED SON; OF GOD."
WHOM "THOU ART MY BELOVED SON;
THEE I AM WELL PLEASED."

MICHAEL FINNEGAN

THERE WAS AN OLD MAN NAMED MICHAEL FINNEGAN,
HE HAD WHIS- KERS ON HIS CHIN- NE- GAN, THEY FELL OUT
WITH A PIN- NE- GAN, THEN HE
GREW FAT AND THEN GREW THIN A- GAIN, CAUGHT A FISH AND DIED
AGAIN ; POOR OLD MICHAEL FINNEGAN, BEGIN AGAIN.
THEN GREW IN
DROPPED IT IN
HAD TO BEGIN

VISUALLY ENHANCED TEXT AND METHOD OF PREPARATION

FIELD

Embodiments of the invention relate to the fields of text comparison, text arranging, and text teaching.

BACKGROUND

For the purposes of teaching and learning text passages are often compared to one another to highlight the similarities and differences between two or more texts. Passages which are identical in multiple texts may be more important for understanding the meaning of the texts than passages which occur in only one text. For example the biblical texts of the new testament gospels are often compared to highlight relationships between different gospels.

Often when texts are compared the texts are arranged in vertical columns, with similar passages horizontally adjacent on the page. FIG. 1, a page reproduced from *Synopsis of the four Gospels*, Kurt Aland editor, American Bible Society, New York, N.Y., 1982, is a typical example. When a given text is longer than the other texts white space, or gaps, are allowed to form in the shorter texts to allow similar passages to remain adjacent to one another. Further examples may be found in the following publications: *A Harmony of the Gospels for Students*, Ralph Daniel Heim, Fortress Press, Philadelphia, 1947, *The NIV Harmony of the Gospels with explanations and essays*, Robert L. Thomas Editor, Stanley N. Gundry Associate Editor, HarperSanFrancisco, division of HarperCollins Publishers, New York, N.Y., 1988, *Gospel Parallels, A comparison of the Synoptic Gospels*, Burton H. Throckmorton, Jr. Editor, Thomas Nelson Publishers, Nashville, Tenn., 1992, and *A Synopsis of the Gospels*, H. F. D. Sparks, Fortress Press, Philadelphia, 1964.

An problem associated with placing similar passages horizontally adjacent is that the reader's eye must jump from column to column to read and compare the texts. The reader may easily lose his place when trying to move the eye back and forth between columns. In addition, placing the texts horizontally adjacent makes it difficult for the reader to compare texts that are distant from one another on the page. Comparing the text in column one to the text in columns three or four is burdensome.

One solution to the problem of placing similar passages horizontally adjacent is to place them vertically adjacent. Vertically adjacent text placement has been used in text translation as shown in U.S. Pat. No. 6,778,950. In this case translated words are placed above or below the corresponding words in the text that is being translated.

Text color coding has also been used to aid learning and understanding of text as discussed in U.S. Pat. Nos. 6,639,139 and 4,270,284. Theses references and all other references described in this application are hereby incorporated herein by reference.

The continued work in the field shows that there is an ongoing need for better ways of comparing texts to facilitate teaching and learning.

SUMMARY

In one aspect embodiments of the invention provide a new method of arranging texts for comparison and for highlighting the repetitions, similarities, and differences between similar texts. The method of creating a visually enhanced text comprises, obtaining a first text and at least one additional text, the texts comprising corresponding and noncorresponding passages, displaying a first text in horizontal lines, displaying the at least one additional text interlinearly with the first text, placing passages in the at least one additional text that correspond with passages in a first text vertically adjacent to the passages in a first text; allowing gaps to form in a first text when noncorresponding text of the at least one additional text is longer than the noncorresponding text in a first text, and replacing multiple copies of identical symbols with a single copy in a different font when the symbols are vertically adjacent within corresponding text passages.

In another aspect embodiments of the invention provide visually enhanced teaching texts comprising at least two texts, arranged interlinearly, with corresponding passages placed vertically adjacent to one another. A visually enhanced teaching text of the invention comprises a first text and at least one additional text, the texts comprising corresponding and noncorresponding passages. The first text is displayed in horizontal lines. The at least one additional text displayed interlinearly with the first text and passages in the at least one additional text that correspond with passages in a first text are placed vertically adjacent to passages in a first text. Gaps are formed in a first text when the noncorresponding text in the at least one additional text is longer than the noncorresponding text in a first text. Multiple copies of identical symbols are replaced with a single copy in a different font when the symbols are vertically adjacent within corresponding passages.

Texts being compared may optionally be displayed in color. Displaying a first text in one color, and a second text in a second color and further texts in further colors assists the reader in remembering the identities of the texts. In addition, individual texts may be displayed on underlines, again providing the reader with a visual aid to assist comprehension.

Texts according to embodiments of the invention may be displayed on paper or other physical media as well as on video displays such as associated with computers. Standard computers comprising one or more processors, volatile memory, non-volatile memory, and at least one display means, such as a video display may be conveniently used to prepare and display texts of the invention. In addition, other display means may also be used including but not limited to portable computer displays, personal digital assistant displays, and portable video player displays.

Embodiments of the invention are useful for comparing different translations of a given text. When translating a text different translators may select the same words for some portions of text passages and different words for other portions of text passages. By highlighting the areas of agreement and disagreement between translations, embodiments of the invention assist the user to understand where areas of ambiguity may exist in the translations, and to better understand the nuances of the original text.

Embodiments of the invention may be useful for document comparison between different versions of a document. Comparison of different versions of a document may help the reader better understand the authors intent.

Embodiments of the invention may be useful for checking electronic mail messages for redundancy. By highlighting redundancies between messages embodiments of the invention may help readers quickly identify the most relevant portions of a new message.

Embodiments of the invention are useful for the study and analysis of the Gospels of the new testament of the Bible. In addition, embodiments of the invention are useful for the study and teaching of songs, where portions of the lyrics are identical from verse to verse.

DESCRIPTION OF THE DRAWINGS

FIG. 1 shows a prior art text comparison arrangement

FIG. 2 shows a visually enhanced text comparison of the invention

FIG. 3 shows a visually enhanced text comparison for the lyrics of a traditional song

DETAILED DESCRIPTION

As used herein a 'passage' is a portion of a larger text. When comparing one text to another a passage in a first text may be similar to or identical to a passage in a second text.

As used herein 'correspond' and 'corresponding' refer to text passages which are similar or identical to one another. A first passage in a first text corresponds to a second passage in a second text when the two passages are similar or identical.

As used herein a "line" or "a line" refers to a passage of text displayed on a printed page or displayed on a video screen. A line may also refer to a group of two or more lines of text which are being compared to one another. A line of text may optionally be associated with a linear horizontal underline. Underlines may be used to provide visual cues to the reader.

As used herein a "symbol" refers to a letter or an ideogram. Vertically adjacent identical letters or ideograms, from corresponding portions of text passages, may be replaced by a single instance of the letter or ideogram, displayed in a larger font, to highlight the identical portions of the passages for the reader.

As used herein "font" refers to the typeface of letters or ideograms used for texts. Fonts may be of differing size, color, style (bold, italic, etc.), and type (Courier, Helvetica, TimesRoman, etc.). A "different font" refers to a second font that differs from a first font in size, color, style, type or a combination of font attributes. Embodiments of the invention use a first font for noncorresponding areas of text passages and a second, different, font for identical corresponding symbols in corresponding areas of text passages.

Embodiments of the invention may be used to teach, study, and analyze texts in a variety of languages. The languages may be textual languages composed of words or ideographic languages composed of ideograms. The texts may be read left to right as with the English, French, Dutch, Spanish, Italian, German and other languages, or the texts may also be read from right to left as with the Hebrew, Arabic, Aramaic, Urdu, Farsi, Syriac and other languages.

Embodiments of the invention may be displayed upon a printed page or they may be displayed upon a video screen, for example a video screen connected to a computer. Embodiments of the invention are used to compare at least two texts to one another. The at least two texts may be compared and aligned using computer programs executing on a computer, the computer comprising one or more processors, volatile memory, non-volatile memory, keyboard, and display means. Methods of the invention may be performed by computer program word processing systems, such as MICROSOFT® Word or Word Perfect, as well as by text markup systems such as HTML (HyperText Markup Language), HTML/CSS (HyperText Markup Language/Cascading Style Sheets), XML (Extensible Markup Language), combinations of these system, or other similar systems. The details of text searching, text matching, text alignment, color control, and font control necessary to carry out methods of the invention, and produce objects of the invention are known to those of ordinary skill in the art.

An embodiment of a method of the invention begins by obtaining at least two texts to be compared. The texts to be compared are arranged interlinearly. A first text is displayed on a first line and a second text is displayed on a second line such that passages in the second text that correspond to passages in the first text are displayed vertically adjacent to one another. The second text may be displayed above or below the first text. If noncorresponding portions of a first text are longer than portions of a second text then gaps or white space areas are allowed to form the in the second text so that the corresponding passages remain vertically adjacent to one another. When corresponding passages are identical the symbols within corresponding passages may be replaced with single instances of the symbols in a different font, thereby providing the reader with a visual cue that the corresponding passages in the two texts are identical.

An alternate embodiment of a method of the invention may be performed by first obtaining at least two texts to be compared. A first text is loaded into a computer memory. At least one additional text is also loaded into a computer memory. Passages in a first text which correspond with passages in at least one additional text are identified using text matching algorithms well known to those of ordinary skill in the art. An interlinear display of the texts is provided to the user wherein the symbols within the noncorresponding passages are displayed upon multiple lines in a first font size. The noncorresponding passages of a first text are displayed on a first line and the noncorresponding passages of at least one additional text are displayed on at least one additional line. Corresponding identical symbols within corresponding passages are displayed upon a single line in a second font. The second font is different from the first font and may differ in size, color, type, style, or a combination of the preceding attributes.

Embodiments of the invention may optionally use different colors, or different types (Times Roman, Ariel, Helvetica, etc.), or different styles (bold, italic, etc.) for different texts thereby providing the reader an ongoing visual cue to the source of the text. In addition the texts may optionally be placed on horizontal underlines which again provides a visual cue which assists the reader.

The texts compared in FIG. 2 are from the second edition of the Revised Standard Edition of the Bible. Four texts are compared, one text each from the Gospels of Matthew, Mark, Luke, and John. In this example each text is printed in a different color and each text is placed upon a separate horizontal underline. The text from Matthew is red; Mark orange, Luke blue, and John green. In the first line we see that the longest passage is from Luke, therefore gaps are allowed to form in the lines containing the other three passages. Also beginning in the first line and continuing onto the second we see that the passage "Jesus came from" is identical in the Matthew and Mark texts. The letters of the passage are shown in a font size about twice as large as the font sized used in noncorresponding passages. In addition, the identical symbols (letters in this case) of the corresponding passage "Jesus came from" are printed using both the red color for Matthew and the orange color for Mark. The top half of the letters are red and the bottom half of the letters are orange.

In the sixth line of FIG. 2 the passage "the heaven(s)" corresponds in the Gospels of Matthew, Mark, and Luke. Because "heaven" is displayed in a font about triple the size of font used in the noncorresponding passages we see that the letters of "heaven" are present in all three Gospels. However because the letter "s" of "heavens" is displayed in a font about double the size of the font used in the noncorresponding passages we see that "heavens", the plural, is only used in Gospels of Matthew and Mark. Similarly on the seventh line of FIG. 2 the word "descend" is present is three forms, "descend", "descended", and "descending." The use of a font that is about four times the size of the font used for noncorresponding passages indicates that the letters of "descend" appear in all four Gospels. The use of a font of about twice the size of the font used for noncorresponding passages, as well as the position on the line, and the colors used indicate that the letters of the suffix "ing" are present in the Gospels of Matthew and Mark. In addition the use of a font the same size as the font used for noncorresponding passages, as well as the position on the line, and the color used indicates that the letters of the suffix "ed" appear only in the Gospel of Luke.

Another set of corresponding passages may be seen on line 9, "A voice came from Heaven." In this case we see that most of the passage (A voice~from Heaven) corresponds in three of the texts, Matthew, Mark, and Luke. These words are shown in a font size which is about triple the size of the non corresponding passages, and corresponding words are printed using three colors, red, orange, and blue, for Matthew, Mark, and Luke. The top third of the letters is red, the middle third is orange, and the bottom third is blue. One word of the passage (~came~) is corresponds in two of the passages, Mark and Luke. Since the word corresponds in two of the passages it is shown at about twice the size of a noncorresponding word. In addition, the lettering of the word is printed using two colors, orange and blue, for Mark and Luke.

The last line shows a passage which corresponds in all four of the texts, "I am well pleased." Since this passage is present in all four texts it is shown at a font size that is about four times the font size of noncorresponding passages. In addition, four colors are used for the lettering; the top quarter in red; the second quarter in orange; the third quarter in blue; and the bottom quarter in green, the colors used for the four text sources, Matthew, Mark, Luke, and John, throughout the body of the document.

Another example is shown in FIG. 3, the lyrics of the traditional melody "Michael Finnegan." Three verses of the song are shown, the first verse in the color red, the second verse in the color blue, and the third verse in the color green. In this example the first passage of the lyric "There was an old man named Michael Finnegan" and the last passage of the lyric "poor old Michael Finnegan, begin again" are identical the three verses of the song. Since these two passages are identical in each of the lyrics they are shown at about triple the font size of the noncorresponding passages of the verses. As in the previous example multiple colors are used for the lettering of the passages that correspond. In this case the top third of the lettering is red, the middle third is blue, and the bottom third is green.

Persons skilled in the art will appreciate that the invention is not limited by the specific embodiments described above. Various embodiments of the invention may comprise combinations and subcombinations of the elements described and other obvious variations and modifications which would occur to persons skilled in the art.

The invention claimed is:

1. A computer implemented method of creating a visually enhanced text comprising:
   (a) providing a standard computer comprising one or more processor, memory, and display;
   (b) obtaining a first text and at least one additional text, texts comprising corresponding and noncorresponding passages;
   (c) loading the first text and the at least one additional text into the memory of the computer;
   (d) identifying corresponding passages in the first text and the at least one additional text;
   (e) displaying the first text and the at least one additional text interlinearly wherein:
      symbols in the noncorresponding passages are displayed in a first font and in multiple horizontal lines;
      The first text is displayed on a first horizontal line;
      The at least one additional text is displayed on at least one additional horizontal line;
      corresponding identical symbols in the corresponding passages area displayed as a single instance in a second font;
   wherein the second font is different from the first font.

2. The method of claim 1 wherein the second font is larger than the first font.

3. A computer implemented method of creating a visually enhanced text comprising:
   (a) providing a standard computer comprising one or more processor, memory, and display;
   (b) obtaining a first text and at least one additional text, texts comprising corresponding and noncorresponding passages;
   (c) loading the first text and the at least one additional text into computer memory;
   (d) displaying the first text in a horizontal line;
   (e) displaying the at least one additional text interlinearly with the first text;
   (f) for corresponding passages in the at least one additional text and the first text, vertically aligning the corresponding passages in their respective lines;
   (g) allowing gaps to form in the first text when noncorresponding text of the at least one additional text is longer than the noncorresponding text in the first text;
   (h) replacing identical symbols in the corresponding passages with a single copy of the identical symbols in a different font.

4. The method of claim 3 wherein the first text and the at least one additional text are displayed using different colors.

5. The method of claim 3 wherein the first text and the at least one additional text are displayed using different fonts.

6. The method of claim 3 wherein the at least one additional text is at least two additional texts.

7. The method of claim 3 wherein the at least one additional text is at least three additional texts.

8. The method of claim 3 wherein the first text and the at least one additional text are from the Gospels of the new testament of the Bible.

9. The method of claim 3 wherein the first text and the at least one additional text are verses from a song.

10. The method of claim 3 wherein the first text and the at least one additional text are translations of a text.

11. The method of claim 3 wherein the first text and the at least one additional text are placed on horizontal underlines.

* * * * *